Figure 1:
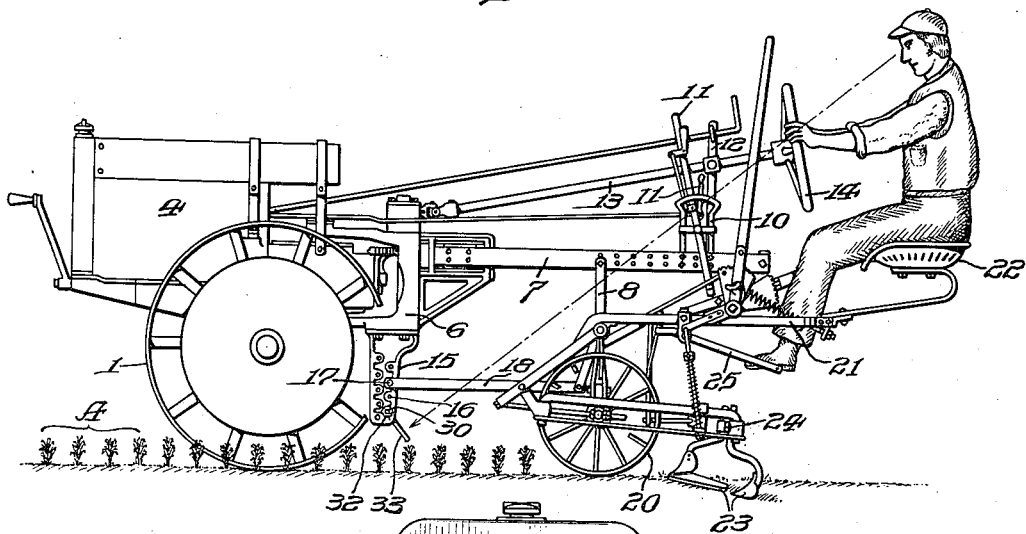

C. J. ALLEN.
TRACTOR.
APPLICATION FILED JUNE 17, 1920.

1,373,852.

Patented Apr. 5, 1921.

WITNESS
F. J. Hartman.

INVENTOR
Charles J. Allen,
BY Blount, Moulton & Heller
ATTORNEYS

UNITED STATES PATENT OFFICE.

CHARLES J. ALLEN, OF MOORESTOWN, NEW JERSEY, ASSIGNOR TO S. L. ALLEN & CO., INC., A CORPORATION OF PENNSYLVANIA.

TRACTOR.

1,373,852.  Specification of Letters Patent.  Patented Apr. 5, 1921.

Application filed June 17, 1920. Serial No. 389,606.

*To all whom it may concern:*

Be it known that I, CHARLES J. ALLEN, a citizen of the United States, and a resident of Moorestown, county of Burlington, State of New Jersey, have invented certain new and useful Improvements in Tractors, of which the following is a specification, reference being had to accompanying drawing.

My invention relates particularly to farm tractors intended for drawing a suitable agricultural implement in agricultural operations. Such implements may be of different forms and are frequently of a type intended to simultaneously perform a cultivating or other operation on a plurality of substantially parallel rows of growing plants. Under such conditions in order to obtain maximum efficiency of cultivation, it is requisite that the various ground working tools be initially adjusted in close proximity to the several rows, and that during the cultivating or other operation the tractor and tools be guided in such manner that they will not come into contact with the plants to the resulting injury of the latter. In order to permit the operator of the implement and tractor to guide the ground working tools so as to follow any slight irregularities or sinuosities in the parallel rows of plants without the necessity of changing the general direction of travel of the tractor itself, the ground working implement is frequently so constructed as to permit a lateral shifting of the ground working tools independently of its general direction of motion, an implement of this character being described and claimed in a pending application for U. S. Letters Patent filed May 14, 1920, by James Monroe Bowen, Serial No. 381,291 entitled Improvements in agricultural implements.

It has been found in practice that owing, among other reasons, to the relatively large size and bulk of the tractor, its necessarily flexible connection with the implement, the distance from the tractor to the point at which the operator is seated, which may be either on a seat supported from the implement itself or on a seat supported from the rearwardly extending tractor beam, and the relatively small size of the plants being cultivated, it is frequently extremely difficult, if not impossible, for the operator to so guide the tractor and effect the relative lateral shifting of the ground working tools as to properly follow the rows, and that even under the best conditions of operation, such as level ground, straight rows of plants and correct adjustment and lubrication of the steering gear of the tractor, the operator is under a constant mental and physical strain imposed by the continuous effort necessary to effect even an approximately proper registration of the ground working tools with the rows.

A principal object of my invention is to obviate these difficulties by the provision in a farm tractor of means to assist the operator in effecting proper registration of the ground working tools with the rows of plants; and to provide means for this purpose through the use of which the operations necessary for properly following the rows become substantially intuitive so that no undue strain or fatigue is entailed thereby.

Further objects of my invention are to provide in a farm tractor, guide or marking means for facilitating the use of the tractor in cultivating operations or the like in which it is necessary to closely follow the rows of growing plants, which means are simple in character and construction, are adjustable to permit employment with rows of plants spaced at different distances and of different heights, and which may be readily embodied in the ordinary forms of farm tractors as at present constructed without material modification thereof.

My invention further includes all of the other objects and novel features of construction and arrangement hereinafter more definitely specified and described.

It will be understood that the invention may be embodied in various types of tractors and that the latter may be coupled with any agricultural or other implement. I have therefore in the accompanying drawing shown the invention in association with a typical form of farm tractor operatively coupled to a cultivating implement adapted for the simultaneous cultivation of a plurality of rows of plants and ʇ ʻodying means for effecting a lateral shifting of the ground working or cultivating tools, an implement of this character forming the subject of said application for U. S. Letters Patent Serial No. 381,291, filed May 14, 1920, to which reference has hitherto been made, but it will be understood that any other suitable form of implement may be employed in connection with the tractor. In the said drawing, Figure 1 is a view in side elevation of the tractor and the implement in operative position, a portion of one of the tractor wheels being broken away for the sake of clearness, and Fig. 2 is a front view of the tractor with the implement removed therefrom and on a larger scale than Fig. 1.

As the particular form of tractor and implement form no part of the invention, extended description thereof is unnecessary herein, but it will be understood that the tractor ordinarily comprises traction wheels 1 rotatable on axles supported by the brackets 2 carried by the housing 3, which also serves to support beneath the hood 4 a suitable motor and transmission mechanism for driving the wheels. The tractor is provided with a vertically pivoted, horizontally movable yoke 6 which serves to support the rearwardly extending beam 7, to which for operative purposes the ground working implement may be connected by means of a strap 8, the beam serving to support one or more suitable brackets 10 carrying the control levers 11 and also a support 12 for the steering post 13, to which is secured the steering wheel 14, through the medium of which the forward part of the tractor may be turned relatively to the yoke 6. All of these parts, as well as the general construction and arrangement of the tractor, will be readily understood by those familiar with the art.

The form of tractor shown comprises a downwardly extending draft plate 15 preferably removably secured to the yoke 6 so as to swing with it, this plate being ordinarily provided with a plurality of holes 16 to facilitate attachment to the plate, as by a bolt 17, of the tongue 18 of the implement, which latter, as shown, is of a type adapted for the simultaneous cultivation of a plurality of parallel rows of plants and comprises *inter alia* supporting wheels 20, a frame 21, operator's seat 22 and a plurality of cultivating tools 23 carried by a transversely extending gang bar 24. Suitable means are provided for raising and lowering the gang bar and for shifting it laterally with respect to the general direction of the movement of the implement, but as the means for effecting these several functions form no part of the present invention, description thereof herein is considered unnecessary further than to say that the lateral shifting of the ground working tools in the form of implement illustrated is effected by vertical movement of the foot levers 25, on the extremities of which the feet of the operator are intended to rest when the implement is in use.

Figure 2:
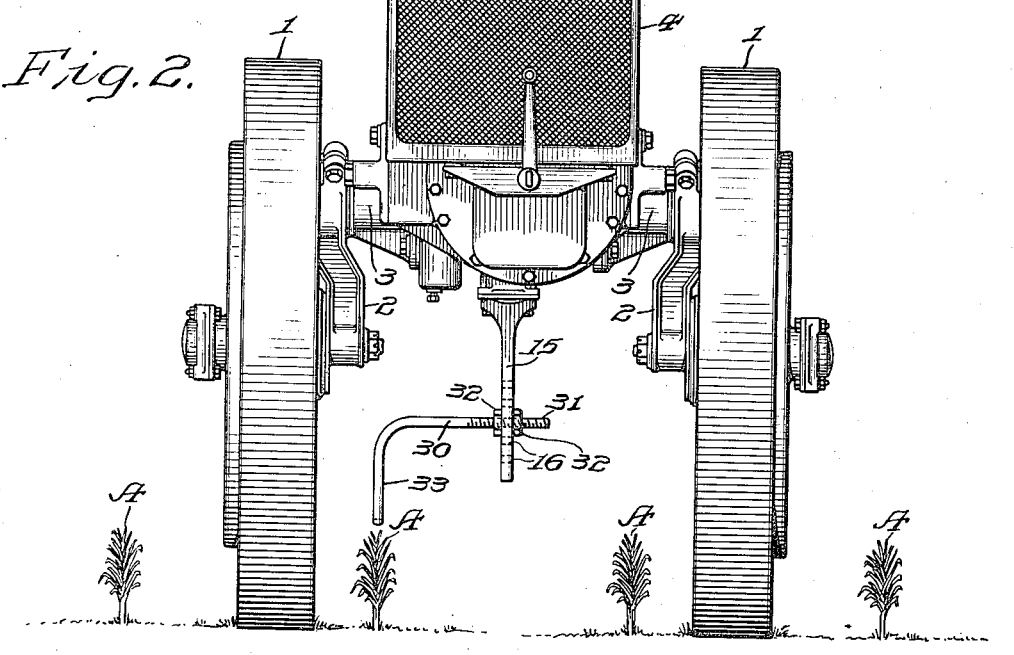

For the purpose of carrying out the objects of my invention, I provide the tractor with suitable guide means preferably positioned in proximity to one of the plant rows, by the observation of which the operator is enabled to accurately judge the course or direction in which the tractor should be steered and the amount of lateral shift, if any, required to cause the tools to properly follow the rows, and while said means may be of any form and construction suitable for accomplishing the purposes intended, I prefer to employ an L-shaped member 30 threaded on one of its arms 31 which is of suitable diameter to conveniently enter one of the holes 16 in the draft plate 15 and to secure the member in adjusted position with respect thereto by any suitable means, as, for example, a pair of nuts 32 threaded onto the arm 31 and adapted to contact with opposite sides of the draft plate, as clearly shown in Fig. 2. As the threads are preferably cut for a considerable distance along the arm it is possible to adjust the member in or out from the draft plate as may be required in order to bring the other arm 33 of the member into registration with one of the rows of plants upon which the cultivating operation is to be performed, and since the draft plate is ordinarily provided with a plurality of superposed holes, it is possible by selecting the proper hole to position the member at any distance above the earth requisite to give suitable clearance so that while not contacting with the plants, the extremity of arm 33 will still lie adjacent thereto. Furthermore, while of course the member may be rotated relatively to the draft plate prior to the tightening of the retaining nuts 32 so as to bring it into any desired relation with respect thereto, I prefer to so adjust the member that its arm 33 will form an angle to the vertical and lie substantially normal to the line of sight of the operator when looking at the member, as indicated in broken lines in Fig. 1.

With the parts constructed and arranged preferably substantially as hereinbefore described, the use of the invention, when employed for example in a cultivating operation, will now be briefly explained: It being desired to cultivate a plurality of rows of plants A, and presuming that the tractor and implement have been brought into position at the end of one of the rows so that the latter will lie between the tractor wheels, and that proper adjustments of the cultivating tools have been made to bring them into proximity to the several rows, the member or marker 30 is adjusted on the draft plate, or other portion of the tractor to which it is adapted to be secured, so that its free arm 33 is brought over one of the rows, conveniently referred to as the guide row, and lying between the tractor wheels, at a sufficient height to clear the row but still be in proximity thereto, and rotated to a position in which the arm will lie substantially at right angles to the operator's line of sight when observing the marker. The tractor is now put in motion, and the operator guides the same generally down the rows in a straight line while continuously observing the relative position of the marker and its adjacent or guide row. Of course so long as the direction of the rows is perfectly straight the relation of the marker and the guide row will remain unchanged, but if any slight irregularity or sinuosity of the rows is encountered the marker and the guide row will begin to separate, which is a signal to the operator to effect a lateral shifting of the ground working tools sufficient to compensate therefor without changing the general direction of travel of the tractor. Ordinarily the amount of deviation of the rows from a straight line is not excessive and does not continue more than a few yards so that after the tractor has progressed for a short distance farther, a point is encountered at which the rows again assume their normal course and the guide row again comes into coincidence with the marker, which is a signal to the operator to release the lateral shifting mechanism and allow the cultivator blades to swing back to their normal position.

It has been found that after a period of use sufficient to enable an operator to become familiar with the method of guiding the tractor and shifting the cultivating blades in conformity with the relative position of the marker and the guide row, the cultivating or other operations may be performed with extreme accuracy and without undue fatigue, since, under ordinary conditions, it is only necessary to initially direct the tractor straight down the rows and to compensate for the ordinary inequalities or sinuosities thereof by moving the cultivating tools in conformity with the relative position of the marker and the guide row, this action being performed almost intuitively by the operator as he watches the marker moving along the row.

Furthermore, by suitable adjustment toward or from the draft plate, the marker may be readily arranged for use with rows of plants spaced at different widths, while by selecting a suitable hole for its attachment to the draft plate, proper vertical adjustment for use with plants of different heights may readily be effected.

While I have herein described with considerable particularity a preferred embodiment of my invention and illustrated the same as embodied in a tractor of well known form, I do not thereby desire or intend to limit myself specifically thereto, as it will be understood that changes and modifications may be made in the form of the marker itself and its method and point of attachment to the tractor, and that the latter may be of any suitable type or construction, without departing from the spirit and scope of the invention as defined in the appended claims.

Having thus described my invention, I claim and desire to protect by Letters Patent of the United States:—

1. The combination with a farm tractor having a depending draft plate, of a marker movably secured to said draft plate for indicating the position of the tractor.

2. The combination with a tractor having a depending draft plate, of indicating means, and means for securing said indicating means in vertically and laterally adjusted position on said plate.

3. The combination with a farm tractor having a depending draft plate, of indicating means comprising an L-shaped member, one of the arms of said member being adapted for attachment to said plate, and means for securing said arm to said plate in operatively adjusted position.

4. The combination with a tractor having a depending draft plate, of indicating means comprising an L-shaped member having a threaded arm adapted to extend through said plate, and means comprising a pair of nuts threaded on said arm operative to secure said arm in adjusted position on said plate.

5. The combination with a tractor, of vertically and horizontally adjustable marking means positioned between the wheels of the tractor.

6. The combination with a tractor having driving wheels, a power mechanism carried thereby and a member and beam relatively movable with respect thereto, of a marker carried by said member and positioned between the wheels of said tractor.

7. The combination with a tractor having driving wheels, a power mechanism carried thereby and a yoke and beam relatively movable with respect thereto, of a marker, and means for operatively maintaining said marker in vertically and horizontally adjusted position with respect to said yoke.

8. The combination with a tractor having driving wheels, a power mechanism carried thereby, a yoke horizontally movable with respect thereto and a draft plate carried thereby, of a marker comprising an L-shaped member having a threaded arm, and means coöperative with said threaded arm operative to secure said member to said plate in vertically, laterally and rotatably adjusted position.

In witness whereof, I have hereunto set my hand this 15 day of June, A. D. 1920.

CHARLES J. ALLEN.